United States Patent [19]

Neitzke

[11] 4,195,434

[45] Apr. 1, 1980

[54] FISHING LINE REEL

[76] Inventor: Harold H. Neitzke, 4340 Whispering Pines Rd., West Palm Beach, Fla. 33406

[21] Appl. No.: 935,355

[22] Filed: Aug. 21, 1978

[51] Int. Cl.$^2$ .......................................... A01K 89/015
[52] U.S. Cl. .................... 43/20; 242/84.1 R
[58] Field of Search ............... 242/84.1 R, 84.4; 43/20, 21

[56] References Cited

U.S. PATENT DOCUMENTS

| | | | |
|---|---|---|---|
| 1,328,696 | 1/1920 | Smith | 43/20 |
| 1,763,934 | 6/1930 | Soltis | 43/20 |
| 2,144,635 | 1/1939 | Norton | 43/20 |
| 2,494,952 | 1/1950 | Luton et al. | 43/21 |
| 2,904,920 | 9/1959 | Lirette et al. | 43/20 |
| 3,064,385 | 11/1962 | Pickard | 242/84.1 A |

*Primary Examiner*—Billy S. Taylor

[57] ABSTRACT

The reel attaches to the base end of a hollow fishing pole which may be a one-piece pole or multiple-section telescoping pole by means of a tapered thread compression nut. The reel comprises a hollow tubular housing for receiving a spool for the fishing line. The spool is advanced into the housing by means of a lead screw secured at one end to the spool and threadedly engaged at its other end with the base of the housing. A handle is preferably attached at a remote end of the spool so that as the spool is rotated by the handle, the spool advances by means of the lead screw into the housing. The fishing line extends through the hollow pole, (or through guides on a solid pole), through a passage in the housing, through a guide notch of the housing and about the spool. As the spool moves into the housing the line is wound thereabout, always remaining inside the housing. A pivotal locking lever locks the spool in fixed position relative to the housing in a number of different longitudinal positions.

16 Claims, 4 Drawing Figures

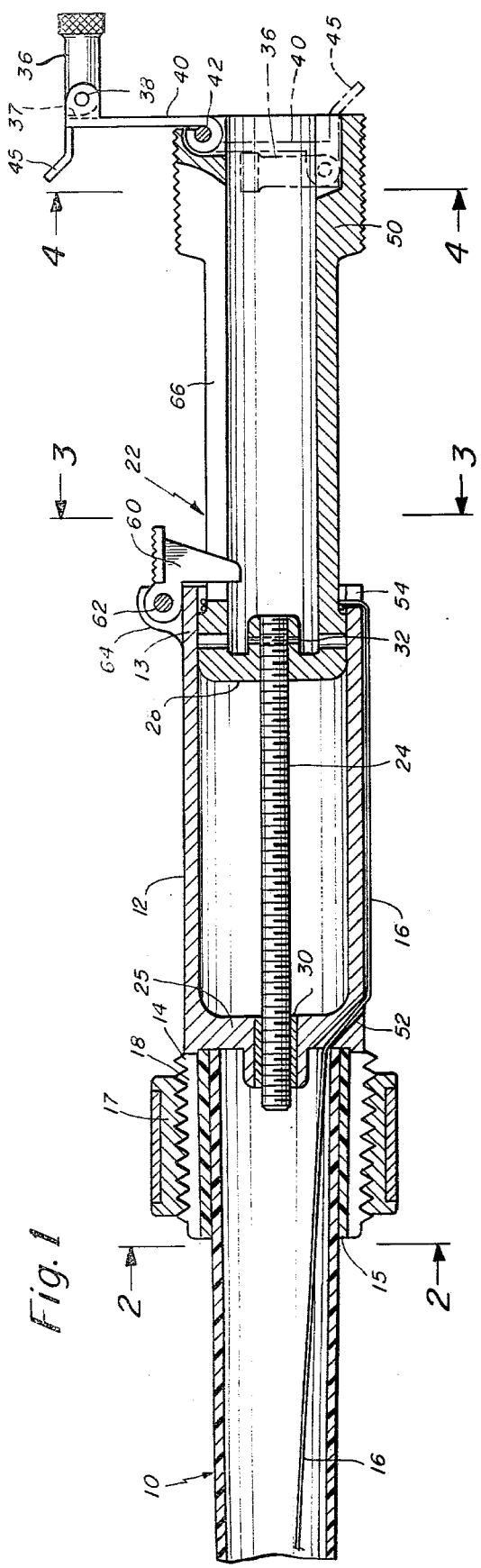
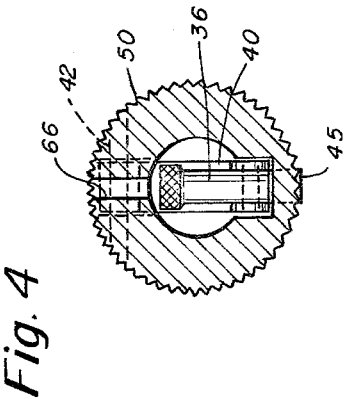
Fig. 4
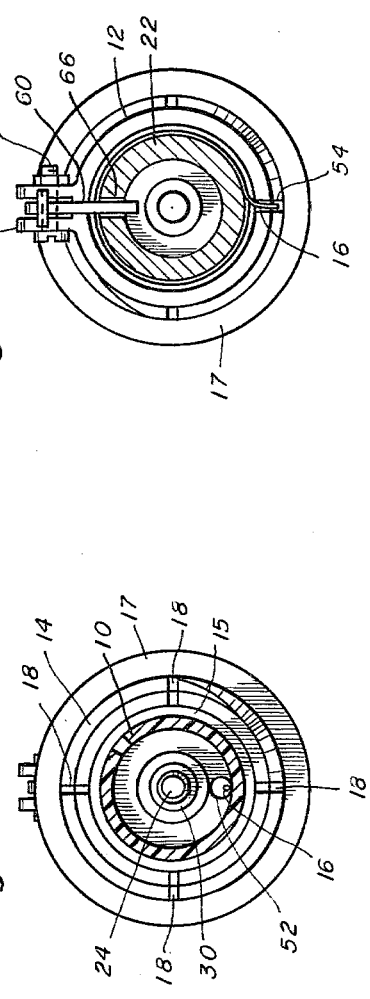
Fig. 1
Fig. 3
Fig. 2

FISHING LINE REEL

BACKGROUND OF THE INVENTION

The present invention relates in general to a fishing line reel for use in conjunction with a fishing pole which may either be a one piece pole or a multiple-section telescoping pole. More particularly, this invention relates to a level-wind, spool-type reel for accommodating a monofilament fishing line. Although the reel of this invention may be used with any type of fishing pole, it is preferably used with a hollow fishing pole wherein the fishing line extends through the hollow pole. Also, although the reel is primarily intended for the storage of the line when the pole is not in use, it can also be used to change the length of the extended line while fishing or reeling in a fish.

There are a number of prior art patents directed to fishing reel constructions, such as depicted in the following U.S. Pat. Nos.: Stuart 49,663 Hill 472,263; Norton 1,955,973; Duplantis 2,711,046; Nagy 2,834,559; Pickard 3,064,385; and, Norton 2,144,635. One of the disadvantages with the prior art constructions is their general complexity. In this regard, note the Stuart U.S. Pat. No. 49,663 which requires a number of components including a complicated gear arrangement. Other constructions provide for the fishing line to be external of the pole which is a disadvantage in that the line can more easily become tangled. Furthermore, in some prior art constructions the reel is relatively expensive to manufacture primarily because of the large number of components comprising the reel. Furthermore, these reels are not well suited for manufacture of the components in plastic or the like.

Accordingly, it is an object of the present invention to provide an improved fishing line reel preferably for use with a hollow fishing pole and which is relatively simple in construction. The primary use of the reel of this invention is for use with a pole having a relatively small length of line associated therewith such as, for example, a 15 foot extended line.

Another object of the present invention is to provide a fishing line reel that is constructed with a relatively few parts without the use of any complex gear arrangements. Because of the use of a simple, few-part construction, the reel of this invention can be made quite inexpensively.

A further object of the present invention is to provide a fishing line reel comprised of components at least the majority of which may be constructed in plastic.

Still another object of the present invention is to provide a fishing line reel wherein the spool for the line may be locked in any one of a number of different positions for permitting different lengths of line to extend from the pole. The spool may also be locked in a totally wound position wherein the pole may be collapsed for storage or transportation.

SUMMARY OF THE INVENTION

To accomplish the foregoing and other objects of this invention, there is provided a fishing line reel attached to the base of a fishing pole which is preferably a hollow fishing pole, although concepts of this invention may also be used in conjunction with a solid-type fishing pole with guides. The reel of this invention comprises a tubular housing having an open end and means, such as a tapered compression nut, at another end of the housing for attaching the housing to the fishing pole. The fishing line is wound upon a spool which is dimensioned to telescopically fit within the housing through the open end thereof. When the reel is totally unwound the spool is extending substantially fully from the housing. On the other hand, when the reel it totally wound the spool is substantially fully telescoped into the housing. The operation of the spool relative to the housing is accomplished by means of a lead screw extending axially within the tubular housing supported between the other end (base) of the housing and a first end of the spool, and means at the opposite second end of the spool for rotating the spool on its axis to thereby advance the spool into the housing. In the disclosed embodiment, the lead screw is preferably fixed to the spool and threadedly engaged with the housing so as to prevent wobble of the spool relative to the housing. However, in an alternate embodiment the lead screw may be fixed to the housing and threadedly engaged with the spool. For a hollow fishing pole the line preferably extends therethrough, through a guide hole in the housing to the outside surface of the housing and about a guide notch at the open end of the housing for guiding the fishing line onto the spool with the line being level-wound onto the spool as the spool advances into the housing. The outer exposed section of line may be useful to enable use of the arrangement for retrieving the line by hand as one does with a flyrod.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a longitudinal cross-sectional view through a reel of this invention showing a fragment of the associated pole;

FIG. 2 is a cross-sectional view taken along line 2—2 of FIG. 1;

FIG. 3 is a cross-sectional view taken along line 3—3 of FIG. 1; and

FIG. 4 is a cross-sectional view taken along line 4—4 of FIG. 1.

DETAILED DESCRIPTION OF THE DRAWINGS

The drawing shows a preferred version of the present invention for use with a hollow telescoping type fiberglass fishing pole 10. The reel is attached to the base end of the fishing pole 10. The reel comprises a tubular housing 12 having opened end 13 and threaded end 14. The end 14 is externally threaded and has a passage for receiving the base of the pole 10. Between the end 14 and the pole 10 there is preferably provided a split plastic bushing 15. The reel may be provided with bushings of varied size so that the reel can accommodate different diameter of poles. The housing 12 is preferably constructed of a plastic material and in order to secure the housing 12 fixedly to the pole, there is provided a tapered compression nut 17 which is properly rotated to tighten the housing about the base of the pole. It is noted that the housing is also provided with four diametrically disposed compression slots 18 which permit the end 14 to compress about the base of the fishing pole.

The fishing line 16 extends through the hollow fishing pole 10 and is wound about the cylindrical spool 22.

The spool 22 is dimensioned to telescopically fit within the housing through the open end 13 of the housing.

The lead screw 24 which comprises the means for moving the spool 22 relative to the housing 12, in the disclosed embodiment is a threaded rod extending between wall 25 of the housing and wall 28 of the spool. The wall 25 has a passage for receiving an internally-threaded bushing 30. Similarly, the wall 28 of the spool has a passage for receiving one end of the lead screw 24. The lead screw 24 is fixed to the spool 22 by means of the drive pin 32 which prevents any relative rotation between the lead screw and the spool. Therefore, upon rotation of the spool 22 in a clockwise direction, as viewed in FIG. 3., the lead screw 24 is rotated in the threaded bushing 30 so that the lead screw 24 actually progresses into the hollow fishing pole, at the same time advancing the spool 22 into the tubular housing 12.

Means are provided at the end of the spool 22 remote from the housing for rotating the spool on its axis. In the drawing this means comprises a handle 36 which connects by means of pivot pin 38 to arm 40. The arm 40 pivots upon a bolt 42 which has a self-locking nut which can provide a friction adjustment for the pivoting of the arm 40. The handle 36 preferably has a right angle shoulder 37 limiting the handle to the position shown in solid in the drawing. This position is the operating position for rotating the spool 22 to advance the spool into the housing 12 by means of rotation of the lead screw 24 in the housing bushing. The drawing also shows the handle and arm in a folded position in phantom. The structure for rotating the spool also includes a lip 45 extending from the arm 40. This lip is useful especially in the folded position for removing the handle from its stored position shown in phantom in FIG. 1.

In addition to the use of the handle 36 for rotating the spool 22, the spool is also provided with a raised end 50 that is externally knurled. The knurled surface of the spool permits hand rotation thereof in place of the use of the handle 36. In either case, upon clockwise (as shown in FIG. 3) rotation the spool progresses inwardly and upon counterclockwise rotation the spool progresses outwardly with relationship to the housing.

The drawing shows the fishing line 16 extending through the hollow pole 10. In addition, the housing 12 is provided with a slanted hole 52 which permits the line 16 to extend therethrough to a position outside the housing wherein it extends along the housing as depicted to the notch 54 at the open end of the housing where the line is guided by this notch to the spool 22. In the assembly of the reel of this invention the line is threaded down through the pole from the tip end and out the base. With the compression nut 17 not yet tightened and with housing 12 separated from the pole, the line is then threaded through the hole 52, through the notch 54, and tied about the spool 22 with the spool 22 backed all the way out as far as possible from the housing. The reel is then locked to the pole by operation of the tapered compression nut 17. As the spool is threaded clockwise, the lead screw causes the spool to move inward of the housing and thereby level-wind the line onto the spool with the line always remaining inside the housing and not being externally exposed which, of course, is an advantage of the invention in that the line remains protected from the outside environment.

The spool 22 is also preferably locked in any one of a number of different positions by means of the locking lever 60 which pivots from the bolt 62 which has associated therewith a self-locking nut for providing friction adjustment. The bolt 62 in turn is supported from a flange 64 at the end 13 of the housing. The pivoting locking lever 60 extends into a relatively narrow slot 66 in the spool. This slot 66 extends substantially the whole length of the spool so that for each rotation of the spool the locking lever may be used to lock the spool in a fixed position relative to the housing thus regulating the amount of extended line.

When the reel is in use, generally the locking lever is in the locked position. If additional line is to be let out, then the locking lever is moved to its unlocked position and the spool may be rotated counterclockwise by pulling on the line. The locking lever can then again be engaged to hold the spool in any predetermined position. With the locking lever again disengaged the spool can be wound totally clockwise until the line is entirely wound. The line may be unwound by pulling on any part of the exposed line "16" or pulling on the position extending from the tip.

In one embodiment of the invention of the spool 10 may have a diameter of approximately one inch. With a one inch spool approximately one foot of line is taken up with four rotations of the spool 22. Twenty-five feet of line can thus be taken up with less than one hundred turns. The length of line wound, of course, may be controlled by control of the number of threads per inch of the lead screw.

Another advantage of the present invention is that the pole and reel combination can be quite easily used as a fly rod. This is possible because of the construction wherein the fishing line 16 is exposed between the hole 52 and notch 54. This permits handling of the line between those points on the outside of the housing 12.

Having described one embodiment of the present invention, it should now be apparent to those skilled in the art that numerous other embodiments can be constructed in accordance with this invention. For example, the lead screw 24 is shown affixed to the spool and threaded relative to the housing. However, in an alternate embodiment the lead screw may be threaded relative to the spool and fixed in relationship to the housing in which case, upon rotation of the spool, lead screw 24 will extend into the spool rather than extending into the pole. Of the two arrangements for the lead screw 24, the preferred arrangement is the one disclosed in the drawing as this arrangement minimizes the wobble between the spool and the housing. In the alternate arrangement wherein the lead screw is threaded with the spool, there may be a tendency for the spool to wobble, possibly causing a faster wear between the lead screw and the threaded receptable of the spool for accepting the lead screw.

What is claimed is:

1. A fishing line reel for a fishing pole comprising:
   a tubular housing having an open end and means at another end for attaching the housing to the fishing pole,
   a spool upon which the fishing line is to be wound dimensioned to fit telescopically within said housing through said open end,
   a lead screw extending axially within the tubular housing supported between said another end of the housing and a first end of said spool,
   one of said housing and spool having thread means for receiving said lead screw,
   means at a second end of said spool remote from said housing for directly rotating the spool on its axis thereby to advance the spool into the housing, and means adjacent the open end of the housing for guiding the fishing line, when present, onto said spool as the spool advances into the housing.

2. A fishing line reel as set forth in claim 1 wherein said means for attaching the housing to the pole comprises an open passage at said another end into which the pole fits, in combination with a compression nut threaded externally to the housing for compressing the wall defining the passage tightly about the pole.

3. A fishing line reel as set forth in claim 2 including a bushing disposed between the pole base and the wall defining the passage.

4. A fishing line reel as set forth in claim 1 including means for locking the spool relative to the housing in one of a number of different positions corresponding to different lengths of fishing line.

5. A fishing line reel for a fishing pole comprising:
a tubular housing having an open end and means at another end for attaching the housing to the fishing pole,
a spool upon which the fishing line is to be wound dimensioned to fit telescopically within said housing through said open end,
a lead screw extending axially within the tubular housing supported between said another end of the housing and a first end of said spool,
one of said housing and spool having thread means for receiving said lead screw,
means at a second end of said spool for rotating the spool on its axis thereby to advance the spool into the housing,
means adjacent the open end of the housing for guiding the fishing line, when present, onto said spool as the spool advances into the housing,
and means for locking the spool relative to the housing in one of a number of different positions corresponding to different lengths of fishing line,
wherein said locking means includes, in combination, a longitudinal slot on the spool for receiving a locking lever supported from the open end of the tubular housing, said locking lever being selectively moved into and out of the slot and being in a locked position when in the slot thus blocking rotation of the spool relative to the housing.

6. A fishing line reel for a fishing pole comprising:
a tubular housing having an open end and means at another end for attaching the housing to the fishing pole,
a spool upon which the fishing line is to be wound dimensioned to fit telescopically within said housing through said open end,
a lead screw extending axially within the tubular housing supported between said another end of the housing and a first end of said spool,
said housing having thread means for receiving said lead screw,
means at a second end of said spool for rotating the spool on its axis thereby to advance the spool into the housing,
and means adjacent the open end of the housing for guiding the fishing line, when present, onto said spool as the spool advances into the housing,
wherein said lead screw comprises a threaded rod said housing thread means defining an internal thread for receiving the rod and said spool having means for fixing the other end of the rod thereto.

7. A fishing line reel as set forth in claim 1 wherein said pole comprises at least one length of hollow flexible pole having the fishing line extendible therethrough.

8. A fishing line reel as set forth in claim 7 wherein said housing has a hole therethrough for accommodating the fishing line permitting the line to extend along the housing externally thereof to the guide means which comprises a notch at the open end of the housing.

9. A fishing line reel as set forth in claim 1 wherein said pole, housing, lead screw, and spool are all coaxially arranged.

10. A fishing line reel for a fishing pole comprising:
a tubular housing having an open end and means at another end for attaching the housing to the fishing pole,
a spool upon which the fishing line is to be wound dimensioned to fit telescopically within said housing through said open end,
a lead screw extending axially within the tubular housing supported between said another end of the housing and a first end of said spool,
one of said housing and spool having thread means for receiving said lead screw,
means at a second end of said spool for rotating the spool on its axis thereby to advance the spool into the housing,
and means adjacent the open end of the housing for guiding the fishing line, when present, onto said spool as the spool advances into the housing,
wherein said means for rotating the spool includes a knurled outer surface at said second end of the spool.

11. A fishing line reel as set forth in claim 1 wherein said means for rotating includes a handle and means supporting the handle from the second end of said spool.

12. A fishing line reel for a fishing pole comprising:
a tubular housing having an open end and means at another end for attaching the housing to the fishing pole,
a spool upon which the fishing line is to be wound dimensioned to fit telescopically within said housing through said open end,
a lead screw extending axially within the tubular housing supported between said another end of the housing and a first end of said spool,
one of said housing and spool having thread means for receiving said lead screw,
means at a second end of said spool for rotating the spool on its axis thereby to advance the spool into the housing,
and means adjacent the open end of the housing for guiding the fishing line, when present, onto said spool as the spool advances into the housing,
said means for rotating including a handle and means supporting the handle from the second end of said spool,
wherein said spool is at least partially hollow and said means supporting the handle includes pivot means enabling the handle to be folded into the spool when not in use.

13. A fishing line reel as set forth in claim 12 including lip means associated with the rotating means for enabling withdrawal thereof from the spool when to be used.

14. A fishing line reel as set forth in claim 5 including a bolt and self locking nut for supporting the locking level to control the friction of the lever.

15. A fishing line reel as set forth in claim 3 wherein said bushing is a split bushing.

16. A fishing line reel comprising a tubular housing having fixed substantially axially therein at a first end, a lead screw extending freely toward the second end of said housing, means at said first end to attach said housing to a fishing pole or the like, a spool sized to fit telescopically within said housing threadedly engaged at a first end on said lead screw and means at the second end of said spool to rotate said spool on its axis thereby to advance said spool into said housing, and means near the second end of said housing to guide a fishing line, when present, onto said spool, whereby on rotation of said spool to advance it into said housing a fishing line can be reeled on said spool and the line stored on said spool will be within said housing.

\* \* \* \* \*